June 20, 1967 R. F. HINTON 3,326,226
FLUID PRESSURE ACTUATED VALVE
Filed Nov. 8, 1963 2 Sheets-Sheet 1

PRESSURE INPUT FROM BALLAST

INVENTOR.
RAY F. HINTON
BY
ATTORNEY.

June 20, 1967  R. F. HINTON  3,326,226
FLUID PRESSURE ACTUATED VALVE
Filed Nov. 8, 1963  2 Sheets-Sheet 2

INVENTOR.
RAY F. HINTON
BY
P. H. First
ATTORNEY.

United States Patent Office 3,326,226
Patented June 20, 1967

3,326,226
FLUID PRESSURE ACTUATED VALVE
Ray F. Hinton, China Lake, Calif., assignor to the United States of America as represented by the Secretary of the Navy
Filed Nov. 8, 1963, Ser. No. 323,205
3 Claims. (Cl. 137—68)

The invention described herein may be manufactured and used by or for the Government of the United States of America for governmental purposes without the payment of any royalties thereon or therefor.

The present invention relates to a fluid ballast discharge valve, and more particularly to an ambient pressure actuated relief valve wherein a submerged vessel's ambient pressures serve to open the valve to a liquid ballast discharge condition when predetermined pressure levels, or depths, are attained by the vessel.

In the field of deep ocean penetration and investigation, there exists a need for a pressure responsive device, or valve, which will function to discharge a liquid ballast in response to various determinable pressures, as found at variously selected ocean depth levels. This need is accentuated where an experimental submersible vessel, or vehicle, is to transport a pilot to great depths. For the sake of pilot safety, such a vehicle necessitates an incorporation of a simplified emergency system which serves to automatically "dump" a ballast should the vehicle unexpectedly penetrate below a preselected maximum depth.

The general purpose of this invention is to provide a simplified, independently operable pressure responsive valve which opens in response to prevailing pressures at preselected ocean depths for accommodating a discharge of fluid ballast contained within a given submersible vessel.

An object of the instant invention is the provision of an efficient and simplified ballast discharge valve, which functions in response to preselected pressures existing at given ocean depths, for facilitating an expeditious ballast discharge.

Another object is to provide a rapid-acting, ambient pressure responsive valve for functioning in response to predetermined ambient pressure conditions.

A further object is the provision of a pressure responsive relief valve which utilizes ambient pressures for actuating the valve's valve opening mechanism.

Still another object is the provision of a simplified pressure responsive relief valve having a frangible member which ruptures in the presence of predetermined ambient pressures for permitting the pressures to actuate a striker for thereby displacing a valve closure-plug from within the valve to establish a free-flow condition therefor, whereby a fluid may be rapidly discharged through the valve.

Other objects, advantages and novel features of the invention will become apparent from the following detailed description of the invention when considered in conjunction with the accompanying drawings wherein.

Figure 1:
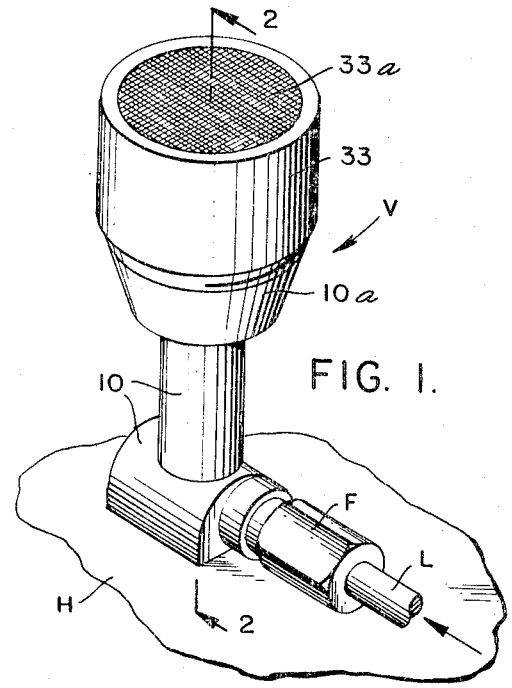
FIG. 1 is perspective view of one embodiment of the invention.

Referring now to the drawings, wherein like reference characters designate like or corresponding parts throughout the several views, there is shown in FIG. 1 an assembled pressure relief valve, generally designated V, so mounted on a vessel's hull structure H as to dispose the valve in a liquid environment at pressures commensurate with penetrated ocean depths. The valve V may be connected to a vessel's ballast discharge line L through any suitable fitting F. The line L functions as a discharge line for discharging the vessel's ballast tanks, and for this reason is normally pressurized during operation of the relief valve. In practice, the ballast often used is a heavy liquid metal such as mercury, therefore, it is deemed desirable that the valve V and line L be so constructed and connected as to provide a minimum of resistance to ballast flow in order that the ballast may be rapidly discharged from the vessel.

Figure 3:
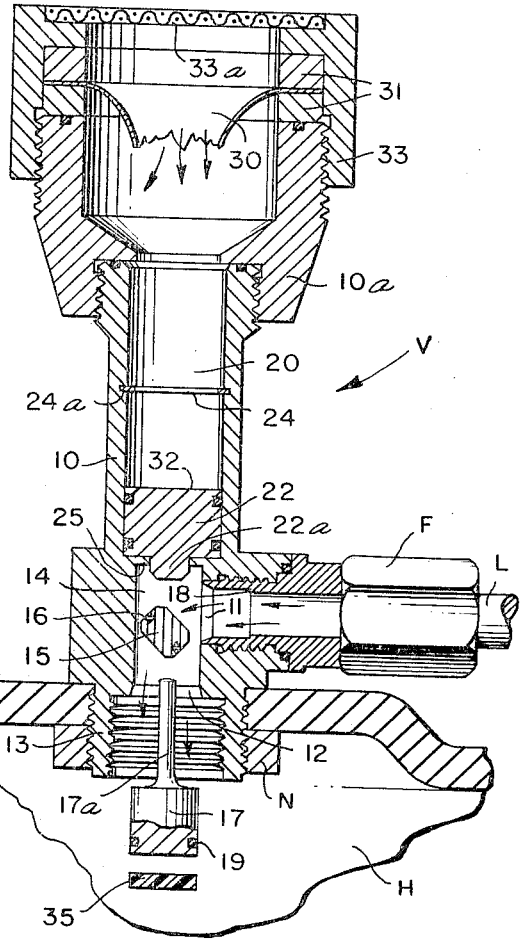
FIG. 3 is a partial cross sectional view of the device as shown in FIG. 1, depicting a "valve-opened" disposition for its various components.
Figure 2:
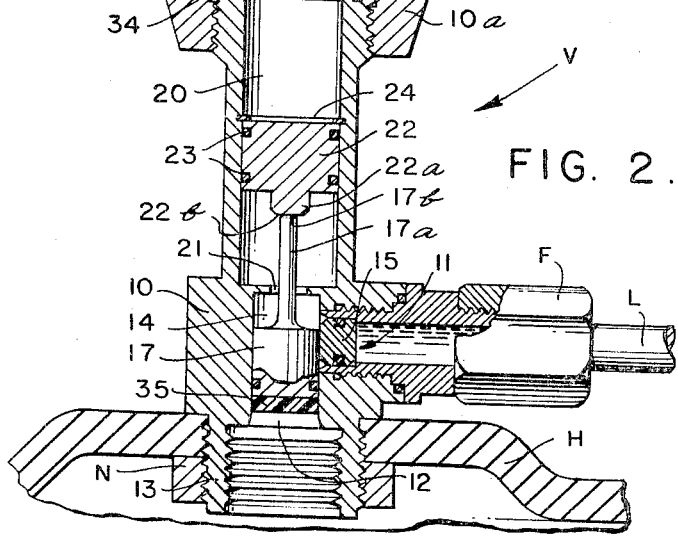
FIG. 2 is a partial cross sectional view of the device shown in FIG. 1 depicting a "valve-closed" disposition for the valve's various components.

Turning now to FIGS 2 and 3, the valve V is so formed, by known machining and/or casting techniques, as to provide the valve V with a valve housing 10. Within the housing 10 there is arranged a pressure port 11 through which a liquid ballast enters the valve housing 10, from the discharge line L, so that it may be passed to a discharge port 12 through which the ballast is normally discharged into a discharge conduit 13. The conduit 13 serves to establish communication between the discharge port 12 and the body of liquid into which the vessel is submerged.

The ports 11 and 12 are disposed approximately 90 degrees apart in a common vertical plane, as viewed in FIGS. 1–4. The ports 11 and 12 communicate through an elongated closure-plug retaining chamber 14 so formed as to be provided with a diameter approximating that of the discharge port 12. Co-axial alignment is established between the chamber 14 and the discharge port 12 for purposes as will hereinafter become more readily understood.

In order to seal the pressure port 11 so that pressurized ballast may not be permitted to flow from the line L into the chamber 14 when the valve is in a normal "valve-closed" condition, a sealing-plug 15 is inserted within the port 11 and sealed by means of an appropriately seated O-ring sealing device 16. However, it is necessary that means be provided for retaining the sealing-plug 15 in a seated disposition within the pressure port 11 when the valve is in a "valve-closed" condition, since the force exerted by the pressurized ballast is necessarily sufficient to unseat the sealing-plug and force it into the chamber 14 and, consequently, out of the valve's housing through the discharge port 12. Therefore, when the valve 10 is in a "valve-closed" condition, it is provided with a slidingly displaceable closure-plug 17. The closure-plug 17 is inserted through the discharge port 12 into the chamber 14 to frictionally engage the chamber's walls for thus forcing or wedging the sealing-plug 15 into a seated position against a suitably formed sealing-plug retaining shoulder 18. The shoulder 18 is formed within the valve's pressure port 11 to serve as a seat against which the sealing-plug 15 may be forced to establish a seated sealing disposition therefor.

It is intended that closure-plug 17 be discharged from the chamber 14 through the discharge port 12 when the valve is opened, or when a "valve-opened" condition is established therefor, as it is desirable that a maximum ballast fluid flow by initiated once the valve is opened in order that the ballast be rapidly discharged at a maximum rate. Therefore, the closure-plug 17 is necessarily formed with a diameter which permits it to readily pass through the discharge port 12 into the discharge conduit 13 with the liquid ballast as the valve is opened. Where deemed desirable, an O-ring sealing device 19 may be provided about the closure-plug 17 so that it may frictionally engage the walls of the chamber.

Formed within the valve's housing 10, in co-axial alignment with, and adjacent to the closure-plug retaining chamber 14, there is a cylindrical striker retaining chamber 20. The cylindrical chamber 20 communicates at its innermost end with the closure-plug retaining chamber 14 through a co-axially disposed interconnecting passageway 21. The passageway 21 is oppositely disposed from the discharge port 12 and accommodates a passage of an elongated closure-plug member 17a, FIGS. 2 and 3. The member 17a may be integrally formed with the closure-plug 17, as a protrusion thereof, and extends for a substantial distance into the striker retaining chamber 20 to terminate at an impact surface 17b.

Slidingly disposed within the striker retaining chamber 20 is a solid body formed as a cylindrical striker 22. The chamber 20 is provided with a diameter which accommodates sliding engagement between the internal wall surfaces of the chamber 20 and the exterior surfaces of the striker 22 so that the striker may be slidingly guided by the chamber walls as it is caused to be displaced. Disposed between the exterior surfaces of the striker 22 and the walls of the chamber 20, there is arranged a pair of O-ring sealing devices 23 seated in grooves appropriately formed about the striker's circumference to insure that a fluidtight seal is maintained about the striker 22 as the striker is displaced in sliding engagement along the walls of the chamber 20 in a manner as will hereinafter be more fully described.

An elongated, integrally formed protrusion 22a extends from the striker 22 and normally terminates within the chamber 20 at an impact surface 22b adjacent the impact surface 17b of the member 17a. When the valve V is in a "valve-closed" condition, the impact surface 22b may be spaced slightly from or engage the impact surface 17b, as deemed desirable. With the surfaces 17b and 22b thus disposed, an impact linkage is established between the striker 22 and the closure-plug 17 through the closure-plug and striker protrusions 17a and 22a, respectively, so that striker displacement, or advance, toward the chamber 14 serves to initiate displacement of the closure-plug 17 towards the discharge port 12.

As a practical matter, it has been found necessary to provide a striker retaining means within the chamber 20 to limit striker displacement in an outward direction, i.e., in a direction away from the closure-plug retaining chamber 14, so that a portion of the chamber 20 may be utilized as an implosion chamber 20', which affords a development of imploding forces for ultimately acting to displace the striker 22. Such means may assume the form of a striker retainer ring 24 seated in a groove 24a machined about the circumference of the chamber 20 and displaced a suitable distance from the chamber 14. In instances where the valve is to be subjected to shock and vibration, it may be deemed advisable to provide a suitable means, not shown, for maintaining the striker 22 in a seated position against the retainer ring 24. Such means may include a flexible member, such as, for example, a conical spring secured within the chamber 20 in a supporting disposition below the striker 22.

As illustrated in FIGS. 2 and 3, the elongated protrusion or portion 17a of the closure-plug 17 extends into the chamber 20 for a distance which affords a displacement of the closure-plug into the discharge conduit 13 when the striker 22 is advanced, or displaced, to a seated position on a stop shoulder 25. The shoulder 25 is formed adjacent the passageway 21 and serves to limit displacement of the striker 22 while the passageway 21 accommodates a passage of the striker's elongated protrusion 22a therethrough. It is to be particularly noted that when the striker 22 is seated on the shoulder 25, FIG. 3, the protrusion 22a is of such a length as to afford an unobstructed passage of the sealing-plug 15 from the pressure port 11 into the chamber 14. Therefore, it is to be understood that when the striker 22 is seated on shoulder 25, the closure-plug 17 is displaced into the discharge conduit 13 so that the sealing-plug 15 may be forced, by ballast pressure, into the chamber 14 and out through the discharge port 12 to establish "valve-open" condition for the valve so that the ballast may be "dumped" into the ocean through the thus opened valve.

Figure 4:
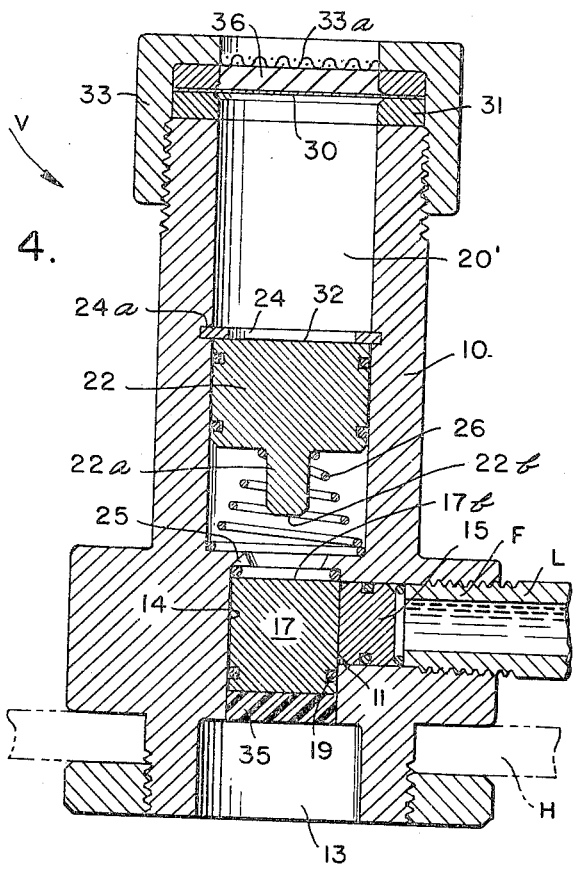
FIG. 4 is a cross sectional view illustrating modification of the device of FIG. 1.

As illustrated in FIG. 4, the elongated portion, or protrusion, 17a of the closure-plug may be eliminated so that the impact surface 17b is established at the surface of the closure-plug 17 adjacent the striker. However, it is deemed advisable to provide a conical spring 26 for maintaining the striker 22 in a normally displaced relationship with respect to the closure-plug 17. Therefore, in order for the impact surface 22b to engage the impact surface 17b, it is necessary for the striker to advance against forces exerted through the conical spring 26. This arrangement may be used in instances where the striker operating forces, as hereinafter more fully described, and the forces of the pressurized ballast are sufficient to insure a complete removal of the sealing-plug 15 from the valve V when it is opened. Certain advantages may be realized utilizing a valve of the type illustrated in FIG. 4. The advantages include a reduction in probability of undesired shock initiated striker displacement, since the striker 22 is positively maintained in a retained position against the ring 24 by the spring 26.

The striker retaining chamber 20 is sealed at atmospheric pressure so that the striker 22 is disposed in an environment of gas at normal atmospheric pressure. For sealing the outmost end of the chamber 20, i.e., the end opposite the end adjacent the chamber 14, a frangible rupture disc 30 is provided and secured across the outermost end of the chamber 20 by any suitable disc holding means 31. The disc 30 functions as a buffer between the striker 22 and the body of fluid, or ocean, into which the valve is to be submerged, and normally prevents a penetration of the ocean water into the chamber 20. However, it is important that it be understood that the disc 30 is capable of being imploded, or ruptured, by a determinable force of prevailing pressures as found at various and preselected ocean depth levels. When the disc 30 is imploded, water enters chamber 20' generating forces of implosion and is caused to impinge at a fluid contact surface 32, as provided on the surface of the striker 22, for causing the striker to be activated and advanced towards the chamber 14. When the striker 22 is advanced to a seated disposition, by the implosive force of the water acting on the surface 32, a "valve-open" condition is established for the valve V in the manner hereinbefore described.

The frangible rupture disc 30 is formed of an alloy of one of the precious metals such as gold, silver, and platinum, and is commercially available under the name of Baker Rupture Discs, manufactured by the Baker Platinum Division of the Engelhard Industries. By using precious metal discs, accuracy in the valve's actuation at desired ocean depths may be held within a tolerance of ±2.5%.

As a practical matter, the particular alloy and size of the disc utilized may be varied as found desirable for various depths. Since the pressure in p.s.i. (pounds per square inch) is readily determinable for a particular depth, a rupture disc may be selected on the basis of its design and fracture characteristics.

Ordinarily, where the disc is to rupture at relatively deep ocean levels, discs of lesser diameters may be used than in instances where the discs are to be ruptured at lesser depths. For this reason the disc holding means 31 may be mounted on the valve's body in various fashions. In practice, it has been found desirable to utilize a threaded cap 33 having a foreign matter screen 33a operatively secured thereto for securing the disc 30 to the housing 10, as illustrated in FIG. 4, or to an expanded implosion chamber housing extension 10a threaded to the housing 10, FIGS. 1–3. Where found desirable, various O-ring sealing devices 34 may be utilized in sealing the extension 10a to the housing 10.

As the valve V may be subjected to corrosive action of sea water for extended periods, before it is to function for discharging a ballast, it has been found desirable to provide means for protecting various exposed surfaces of the valve V from corrosive effects of ocean water. Therefore, a silicon grease imbedded cover-plug 35, usually formed of Teflon, is inserted into the external portion of the discharge port 12. If desired, silicon grease 36 may be used to fill a void created between the disc 30 and the screen 33a for establishing a protective cover for the disc 30.

In the operation or use of the forms of the valve shown FIGS. 1–4, the valve V, secured to a submersible vessel or vehicle and connected with the vessel's ballast discharge line L, is caused to be submerged into a liquid environment, or ocean, into which the vessel is submerged. As the vessel seeks greater depths, environmental fluid pressures inherently increase and apply an increasing force against the rupture disc 30. Should the vessel penetrate below a preselected depth level, increased fluid pressures act to rupture the disc 30. When the disc 30 ruptures, fluid under pressure rushes into the implosion chamber 20' generating forces of implosion which impinge against the striker 22, at its surface 32, for thereby activating the striker 22 and causing it to accelerate to a seated position adjacent the closure-plug retaining chamber 14, whereupon the striker 22 acts to force the closure-plug 17 from the closure-plug retaining chamber 14 and through the discharge port 12 into the discharge conduit 13, which normally terminates beyond the vessel's confines, as may be defined by its hull member H. With the closure-plug thus removed, the sealing-plug 15 is forced from the pressure port into chamber 14, due to ballast pressures pre-established in line L. The ballast is now permitted to flow into the chamber 14, and consequently, through the discharge port 12 to the discharge conduit 13. As the pressurized fluid ballast forces its way through the chamber 14, it carries therewith the sealing-plug 15 into the discharge conduit 13 for ultimate disposal in the ocean for thus establishing a "valve-open" condition for the valve V.

Figure 5:
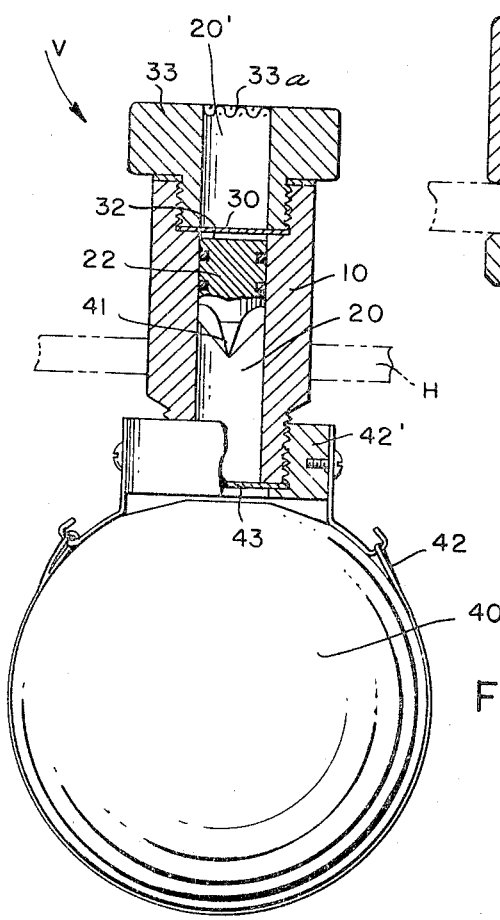
FIG. 5 is a partial cross sectional view of another embodiment of the instant invention.

Referring now to FIG. 5, another embodiment of the invention is illustrated which is particularly useful where the pressurized fluid to be released from a retaining means is a pressurized gas.

The gas under pressure is contained in a gas retaining means, or container 40, formed as a frangible sphere which may collapse under deep ocean level pressures when the gas therein is allowed to escape.

According to this embodiment of the instant invention, the striker 22 is frictionally retained by the wall of the chamber 20 and is provided with a pointed container penetrating means 41. The means 41 serves to fracture or puncture the skin of the container 40 when ambient pressures cause the disc 30 to rupture for allowing the ocean water to slidingly advance the striker 22 in a direction to strike the container 40. As the penetrating means 41 strikes the container 40 the container is fractured, whereby its pressurized contents are allowed to escape. Simplified mounting means, such as straps 42 and mounting blocks 42' may be utilized in connecting the valve housing 10 with the container 40. Further, the sealed portion of the valve housing 10 may terminate in a slightly displaced relationship with respect to the container 40 so that the gas contained therein may readily escape between the housing 10 and the container 40 once the container is fractured. In such instances, it is deemed advisable to provide a frangible sealing-disc 43 for sealing the striker retaining chamber 20. The disc 43 is disposed at the end of the striker retaining chamber 20 nearest the container 40 so that atmospheric pressure may be retained therein. It is to be understood that the disc 43 is so designed as to readily fracture when struck by the penetrating means 41 of an activated striker 22 so that the container penetrating means 41 may continue its displacement to fracture the container 40.

In operation or use of the form of the invention illustrated in FIG. 5, the valve housing 10, being connected with the container 40, is submerged to a depth whereat the pressure is sufficient to rupture the disc 30. When the disc 30 ruptures, the ocean water under pressure impinges on the surface 32 of the striker 22. As the water impinges on the striker 22 the striker becomes activated and accelerates toward the container 40 so that the penetrating means 41 is caused to strike and fracture the container 40. Once the container is fractured, the pressurized gas is permitted to escape from the container through its fractured surface. It is to be understood that it is feasible to initiate an implosion of a vacuumized container 40 merely by utilizing a material, in the design and construction of the container, which will fail as prevailing ambient pressures are applied thereto once the skin of the container is fractured. Such as implosion may be readily detected through the use of conventional hydrophones.

In view of the foregoing description, it is to be understood that the present invention provides a unique pressure actuated valve which responds to pressures present at predetermined ocean depth levels.

It is to be further understood that the herebefore described valve, in its various forms or desired combinations thereof, may be used to perform various functions in addition to performing ballast discharge operations. These various functions include imploding glass spheres for acting as depth sounding devices, triggering mechanisms performing numerous well-known functions at specific depths, serving as warning devices for indicating a certain depth has been attained, and detonating explosive charges at predetermined depths.

Obviously many modifications and variations of the present invention are possible in the light of the above teachings. It is therefore to be understood that within the scope of the appended claims the invention may be practiced otherwise than as specifically described.

What is claimed is:

1. A fluid submersible ambient pressure responsive valve for establishing a relieved condition in a normally pressurized liquid metal ballast discharge line as ambient pressures are increased, through valve submersion, to a predetermined magnitude, comprising in combination:

a valve housing having a ballast inlet port and a ballast discharge port;

means for mounting said housing on a submersible vehicle;

a normally pressurized liquid metal ballast discharge line connected to said housing so as to communicate with the valve's inlet port;

a valve discharge conduit connected with said housing at the discharge port;

means defining a closure-plug retaining chamber within said housing being so arranged as to join said ports at right angles with respect to each other for establishing a communication of said ports therethrough when said valve is in an open condition;

a removable fluid pressure sealing-plug arranged within said inlet port;

a closure-plug displaceably mounted and normally disposed within said retaining chamber for engaging and maintaining said sealing-plug in sealing relationship with said inlet port for establishing closed condition for said valve;

an elongated cylindrical striker chamber formed within said housing and arranged in co-axial alignment with said discharge conduit and so disposed as to have a first end thereof juxtaposed and communicating with said closure-plug retaining chamber and a second end thereof directed outwardly therefrom;

a striker slidably arranged within said striker chamber and displaced from the ends thereof;

means arranged within said striker chamber for normally retaining said striker in a displaced relationship with said second end of said striker chamber for limiting relative outward displacement of said striker;

engaging means for establishing a normally engaged relationship between said striker and said closure-plug when said valve is in a closed condition;

a frangible rupture disc formed of precious metal; and a sealing cap mounted on said housing for sealing said disc across said second end of said striker chamber for sealing said striker chamber from ambient fluid pressures, whereby as said valve is submerged to a predetermined depth, ambient pressures serve to implode said rupture disc for thus permitting said ambient fluid pressures to act on said striker for thereby imparting a displacement thereof toward said closure-plug retaining chamber, whereupon said engaging means causes said closure-plug to pass through said discharge port and into said discharge conduit for permitting said sealing-plug to be forced from said inlet port into said conduit by said ballast to thus establish a relieved condition within said ballast discharge line.

2. An ambient pressure responsive relief valve adapted to be submerged in a body of liquid to a predetermined depth, comprising, in combination:

a valve housing including means defining a valve pressure port and a valve discharge port disposed in a common plane and arranged at ninety degrees with respect to each other;

an elongated closure-plug retaining chamber disposed in co-axial relationship with said discharge port for connecting said ports when said valve is opened;

a closure plug displaceably mounted and normally retained in said retaining chamber in a pressure port sealing position when said valve is closed;

a slidably mounted striker adapted to be slidably advanced for engaging and dislodging said closure-plug and causing it to pass through said discharge port for establishing communication between the ports;

a frangible rupture disc mounted on said housing for serving as a buffer between said striker and said body of fluid so adapted as to be ruptured when pressure within said body of fluid is of a predetermined value; and means for directing the fluid pressure to act on said striker when said disc is ruptured for thereby causing said striker to advance and dislodge said closure-plug.

3. In an ambient pressure responsive relief valve, an imploding device, comprising in combination:

a pressurized fluid retaining means for maintaining a fluid in a pressurized condition relative to ambient pressures;

means defining a striker chamber mounted adjacent said fluid retaining means;

a striker disposed within said chamber and adapted to advance and apply a valve opening pressure to said fluid retaining means for permitting the fluid retaining means to accommodate an escape of the fluid from the retaining means;

a grease coated disc of precious metal arranged to communicate with ambient pressures and secured in sealed relationship across said chamber in an ambient pressure buffing disposition relative to said striker so that as said ambient pressures are increased to a predetermined value, said disc is caused to be imploded for permitting the ambient pressures to act directly on said striker and impart an advancing displacement thereto; and striker retaining means arranged within said striker chamber for normally retaining said striker in a preselected disposition relative to the ends of said striker chamber;

said striker retaining means including a conical compression spring and a retaining ring disposed at opposite surfaces of said striker and being so arranged as to oppose striker displacement within said chamber.

References Cited

UNITED STATES PATENTS

| | | | |
|---|---|---|---|
| 209,380 | 10/1878 | Connelly | 137—325 |
| 1,314,662 | 9/1919 | Huber | 102—7 |
| 1,319,282 | 10/1919 | Huber | 102—7 |
| 2,687,541 | 8/1954 | Bannister | 9—8 |
| 2,780,389 | 2/1957 | Sandgren | 222—5 |
| 2,919,833 | 1/1960 | Wolshin | 137—68 X |

WILLIAM F. O'DEA, *Primary Examiner.*

R. GERARD, *Assistant Examiner.*